(Model.)
C. ALDEN.
Preserving Fresh Fish.
No. 235,116. Patented Dec. 7, 1880.
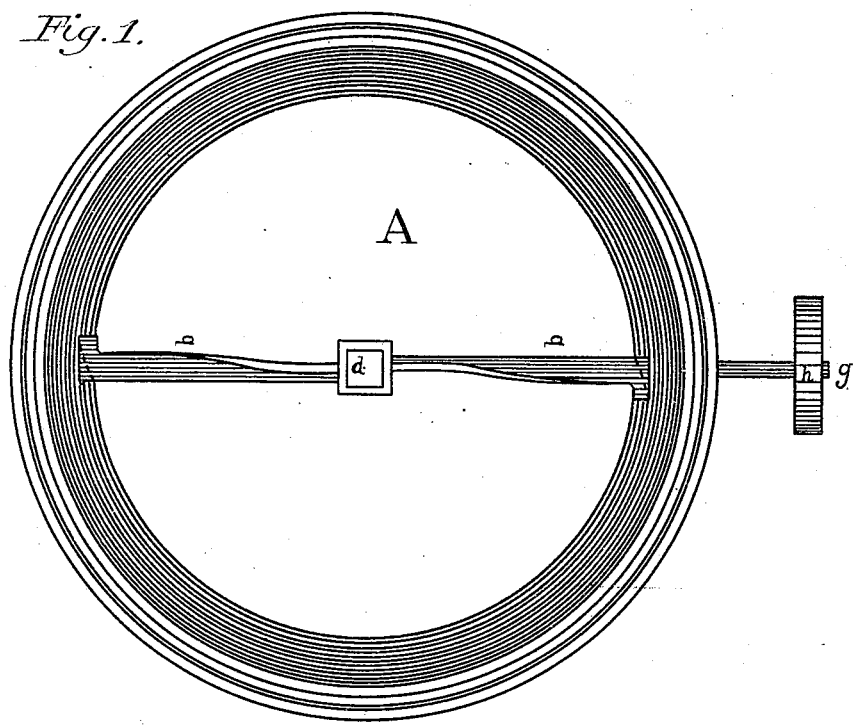
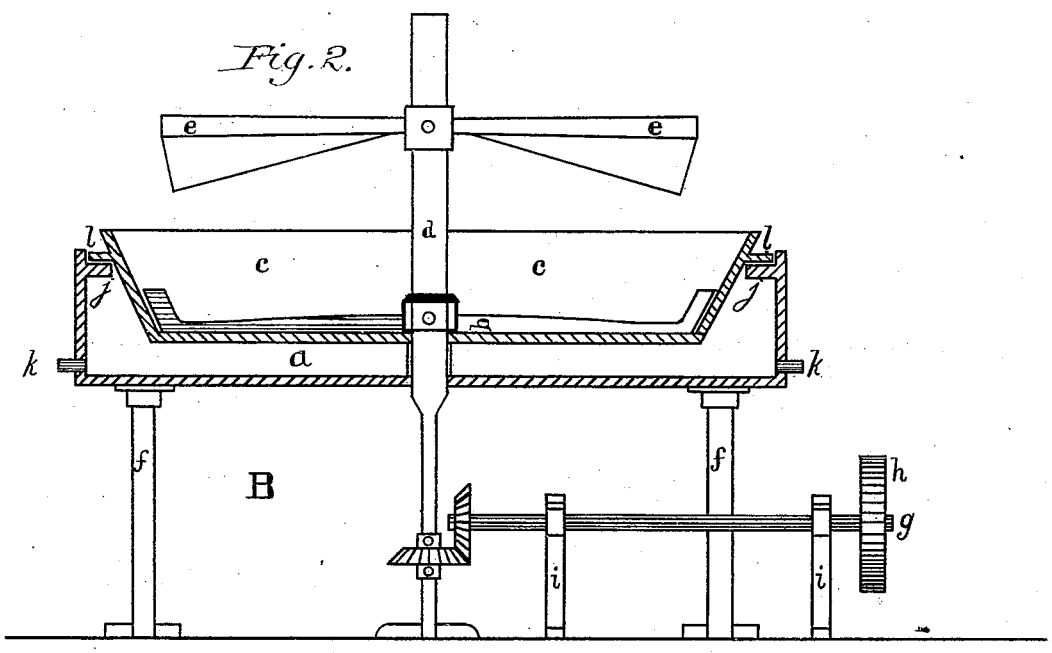
WITNESSES
James M. Macgregor
William Bradley
INVENTOR
Charles Alden

UNITED STATES PATENT OFFICE.

CHARLES ALDEN, OF GLOUCESTER, MASSACHUSETTS.

PRESERVING FRESH FISH.

SPECIFICATION forming part of Letters Patent No. 235,116, dated December 7, 1880.

Application filed July 31, 1880. (Model.)

*To all whom it may concern:*

Be it known that I, CHARLES ALDEN, of the city of Gloucester, county of Essex, and State of Massachusetts, have made and discovered certain new and useful improvements in processes for putting up and preserving fresh codfish and other fresh fish, as an article of food, without the aid of salt or other condiment, whereby a new article of manufacture and commerce is produced, the same not having been used or known previous to my invention.

The following specification and description of my improvements and invention will enable others skilled in the art to understand and use them.

I take fresh fish and remove the heads, tails, fins, entrails, and skins, and also the larger bones, leaving the clear fresh fish meat, which should be cut into pieces of suitable size, thoroughly cleansed in pure cold water, and then placed in an evaporating-pan placed upon and surrounded by a heating-coil or steam-jacket, and having one or more movable blades revolving around on the inside of the pan, so arranged that when in motion the blades will operate upon the principle of the plow, so as to avoid shoving the mass while throwing a furrow in such manner that the fresh fish meat is prevented from adhering to the bottom or sides of the pan, and is kept constantly in a revolving motion, so as to admit free access of the drying atmosphere for rapidly removing the vaporized moisture, in aid of which a fan or vacuum chamber may be used, and the mechanism may be operated by steam or other power.

When the prepared fresh fish meat has been placed in the evaporating-pan, steam is applied to the heating-coils or steam-jacket, and the revolving blades are immediately set in motion, the operation or effect of which is, within a few minutes, to dissolve the fish meat into a jelly-like mass, in which condition, where kept in motion, it soon loses all its free moisture, rapidly disintegrates, and becomes dry or solidified fresh fish fibril having much the appearance of fine broken vermicelli. Under this method the fish fibril separates and entirely frees itself from the minute or smaller bones, so that they may readily be removed.

The fresh fish fibril should be kept in rapid motion until sufficiently dry to remove from the pan, (which is determined by its failure longer to throw off vapor,) when it should be spread upon cooling-screens or muslin until cold, when it may be packed in tin, wood, or paper boxes for keeping or transportation. Under this process the time required is from thirty to forty minutes, and the temperature must be kept below the cooking-point, so as to prevent coagulation of the fish gelatine, and the product or fresh fish fibril will in proportion by weight be as one pound to ten pounds of live fish, and five pounds of prepared fresh fish meat.

The greatest possible celerity should be had and care taken that the prepared fresh fish meat is entirely fresh, pure, and without taint.

Fresh fish put up after evaporating its free moisture and being fibrilized in the manner described retains its entire nutriment and flavor, is free from all foreign and injurious substances, contains no salt, has no affinity for moisture, and will keep in any climate for a long time.

I am aware that preparations of fish food have been made from fresh fish by curing with the aid of salt and condiments, by steaming, cooking, parboiling, and drying or desiccating on stone or other heated surfaces, and by grating, granulating, and cutting or shredding the fish meat in either a dry or moist condition. All of these processes partake of the nature of curing the fish either by kiln-drying, cooking, or condiments, in every instance radically changing the nutritive as well as chemical character or quality of the article, making it no longer fresh fish in any form or condition, while the distinctive feature of my product is, that after undergoing the process, the fresh fish meat still remains raw fresh fish fibrilized in form, and from which the free moisture has been removed by evaporation, and which requires but the addition of water and compression to restore it to its original condition.

Several preparations of fish food, coarse in form, have been made from salted, seasoned, or cured fish of marketable value; but the great affinity of fish for water, when salted, has rendered all preparations from it, when fibrilized or fine in form, comparatively valueless, as it will not keep any considerable time, and all attempts hitherto made of putting up fresh fish granulated or fine in form without the aid of salt or condiments have proven failures, while the characteristic features of my process for preserving fresh fish is the entire disintegration of the fiber as a result following the rapid evaporation of its free moisture by means of the application and co-operation of heat, motion, and currents of air.

In the accompanying drawings, showing the construction of the mechanism employed, A, Fig. 1, represents a plan view of the evaporating-pan and the revolving blades *b b*. B, Fig. 2, shows a sectional view of the evaporating-pan as placed upon a steam-chamber or steam-jacket and its connected appliances.

*a* is the steam-chamber, placed upon supports *f f*, having rests *j j*, for holding the evaporating-pan *c c*, resting on its tamping-rim *l l*, and port-holes *k k*, for connections with a steam-boiler, and an upright shaft running through thimbles in the center of both the steam-chamber and evaporating-pan, the upright shaft *d*, moved by the gearing and shaft *g* and belt-wheel *h*, supported upon the standards *i i*, revolves, carrying the blade *b* on the inside and next adjoining the inner surface of the evaporating-pan *c c*, and also carries, about ten inches above the rim of the pan, a set of fans, *e e*, for removing the moist vapor and supplying air-currents.

Having thus described my method or process, the mechanical means employed, and the resulting product, what I claim is—

1. The process or method of preparing and preserving fresh fish for food in a dry state or condition without the aid of salt, condiments, or any preserving agencies other than disintegrating the fibril of the prepared fresh fish meat, entirely removing the bones, and evaporating the free moisture, (without cooking,) by keeping the mass of fresh fish meat in rapid motion in an evaporating-pan, and the application of steam heat and air-currents for expanding and separating completely the fish fiber, and carrying off its free moisture, substantially in the manner set forth and described.

2. The mechanical means employed for preserving and fibrilizing fresh fish meat—namely, in combination, an evaporating-pan, a heating-coil, steam-chamber or steam-jacket, an air fan or blower, and a movable set of blades revolving on the inside of the evaporating-pan, so adjusted as to entirely prevent the fish meat from adhering to the bottom or sides of the pan, and at the same time keeping it in a rolling or revolving motion, substantially as set forth and described.

3. The resulting product of treating fresh fish meat, as hereinbefore described, being fresh fish finely fibrilized and evaporated, so as to form a nearly water-free substance, as a new article of food, manufacture, and commerce.

CHARLES ALDEN.

Witnesses:
CHARLES T. POLHAMUS,
MYER MASTER.